(12) United States Patent
Schorle et al.

(10) Patent No.: US 8,029,017 B2
(45) Date of Patent: Oct. 4, 2011

(54) AIRBAG INFLATOR MANIFOLD

(75) Inventors: Michael A. Schorle, White Lake, MI (US); Peter L. Vigeant, Whitmore Lake, MI (US); David L. Geyer, Sterling Heights, MI (US)

(73) Assignee: Toyoda Gosei Co. Ltd. (JP)

( * ) Notice: Subject to any disclaimer, the term of this patent is extended or adjusted under 35 U.S.C. 154(b) by 268 days.

(21) Appl. No.: 12/357,600

(22) Filed: Jan. 22, 2009

(65) Prior Publication Data

US 2010/0181747 A1 Jul. 22, 2010

(51) Int. Cl.
*B60R 21/26* (2006.01)
(52) U.S. Cl. .................. 280/736; 280/740; 280/742
(58) Field of Classification Search .................. 280/740, 280/741, 742, 736
See application file for complete search history.

(56) References Cited

U.S. PATENT DOCUMENTS

| | | | | |
|---|---|---|---|---|
| 5,246,249 A * | 9/1993 | Satoh | ............... | 280/731 |
| 5,505,488 A * | 4/1996 | Allard | ............... | 280/740 |
| 5,762,360 A * | 6/1998 | Damman et al. | ............... | 280/728.2 |
| 6,056,319 A * | 5/2000 | Ruckdeschel et al. | ............... | 280/741 |
| 6,062,591 A * | 5/2000 | Ruckdeschel et al. | ............... | 280/728.2 |
| 6,149,192 A * | 11/2000 | Swann et al. | ............... | 280/740 |
| 6,422,600 B1 * | 7/2002 | Crohn et al. | ............... | 280/740 |
| 2007/0057497 A1 * | 3/2007 | Frisch et al. | ............... | 280/740 |

\* cited by examiner

*Primary Examiner* — Paul N. Dickson
*Assistant Examiner* — Joselynn Y. Sliteris
(74) *Attorney, Agent, or Firm* — Carlson Gaskey & Olds PC

(57) ABSTRACT

An example airbag inflator manifold assembly includes a cap portion establishing a plurality of apertures that are operative to communicate flow from an inflator to an airbag interior. A baffle portion redirects at least some of the flow from the plurality of apertures. A mounting face extends radially from the cap portion and is securable to a flange extending radially from the inflator to hold the cap portion and the baffle portion relative to the inflator.

19 Claims, 5 Drawing Sheets

AIRBAG INFLATOR MANIFOLD

BACKGROUND

This application relates generally to a manifold for an airbag inflator.

As known, airbags are used in many vehicle occupant protection systems. Typical vehicle occupant protection systems also include an inflator. Chemical reactions within the inflator produce fluid, such as nitrogen gas, that flows into a folded airbag. The fluid unfolds and expands the airbag to a position appropriate for protecting a vehicle occupant. The inflator typically initiates the chemical reaction in response to a signal from a vehicle sensor. Altering characteristics of the flow, such as flow direction and flow speed, filling the airbag can influence how the airbag expands.

Accordingly, some vehicle occupant protection systems include an inflator manifold near the inflator. The inflator manifold influences how the airbag expands by altering characteristics of flow from the inflator to the airbag. The typical inflator manifold is bulky, complex, and difficult to assemble.

Referring to FIGS. 1 and 2, an example prior art manifold assembly 10 includes a cap portion 14 and a separate baffle portion 16. The cap portion 14 includes a sidewall 18 that extends axially away from a flange 20. The sidewall 18 establishes a plurality of apertures 22 that are configured to direct flow F radially outward from an airbag inflator 26 when the cap portion 14 is secured relative to the airbag inflator 26. When assembled, the baffle portion 16 extends axially away from the flange 20 past the apertures 22. The baffle portion 16 directs the flow F from the apertures 22 in axial direction. The baffle portion 16 protects the associated airbag from damage, for example.

In the prior art, the cap portion 14 is press-fit over an upper portion 27 of the airbag inflator 26 to secure the cap portion 14 relative to the airbag inflator 26 at 28. Interference between the sidewall 18 of the cap portion 14 and the airbag inflator 26 holds the cap portion 14 relative to the airbag inflator 26. Prior to press-fitting the cap portion 14, the airbag inflator 26 is machined to remove ridges 30 that interfere with the press-fitting operation. After securing the cap portion 14, the baffle portion 16 is secured directly to a housing assembly (not shown) with mechanical fasteners 32.

Disadvantageously, the sidewall 18 in the prior art is used to both establish the apertures 22 and to secure the cap portion 14 relative to the airbag inflator 26 through the press-fit. This arrangement increases distance the overall height $h_1$ of the sidewall 18 and the baffle portion 16. Also, in the prior art, the baffle portion 16 and the cap portion 14 are both separately secured relative to the airbag inflator 26.

SUMMARY

An example airbag inflator manifold assembly includes a cap portion establishing a plurality of apertures that are operative to communicate flow from an inflator to an airbag interior. A baffle portion redirects at least some of the flow from the plurality of apertures. A mounting face extends radially from the cap portion and is securable to a flange extending radially from the inflator to hold the cap portion and the baffle portion relative to the inflator.

An example method of controlling flow from an airbag inflator includes guiding at least some flow from an airbag inflator in a radial direction through a plurality of apertures established a cap portion of a manifold and guiding at least some flow from the plurality of apertures in an axial direction using a baffled portion of the manifold. The cap portion and the baffle portion are formed from a single sheet of material.

These and other features of the present invention can be best understood from the following specification and drawings. The following is a brief description of the drawings:

DETAILED DESCRIPTION

Figure 1:
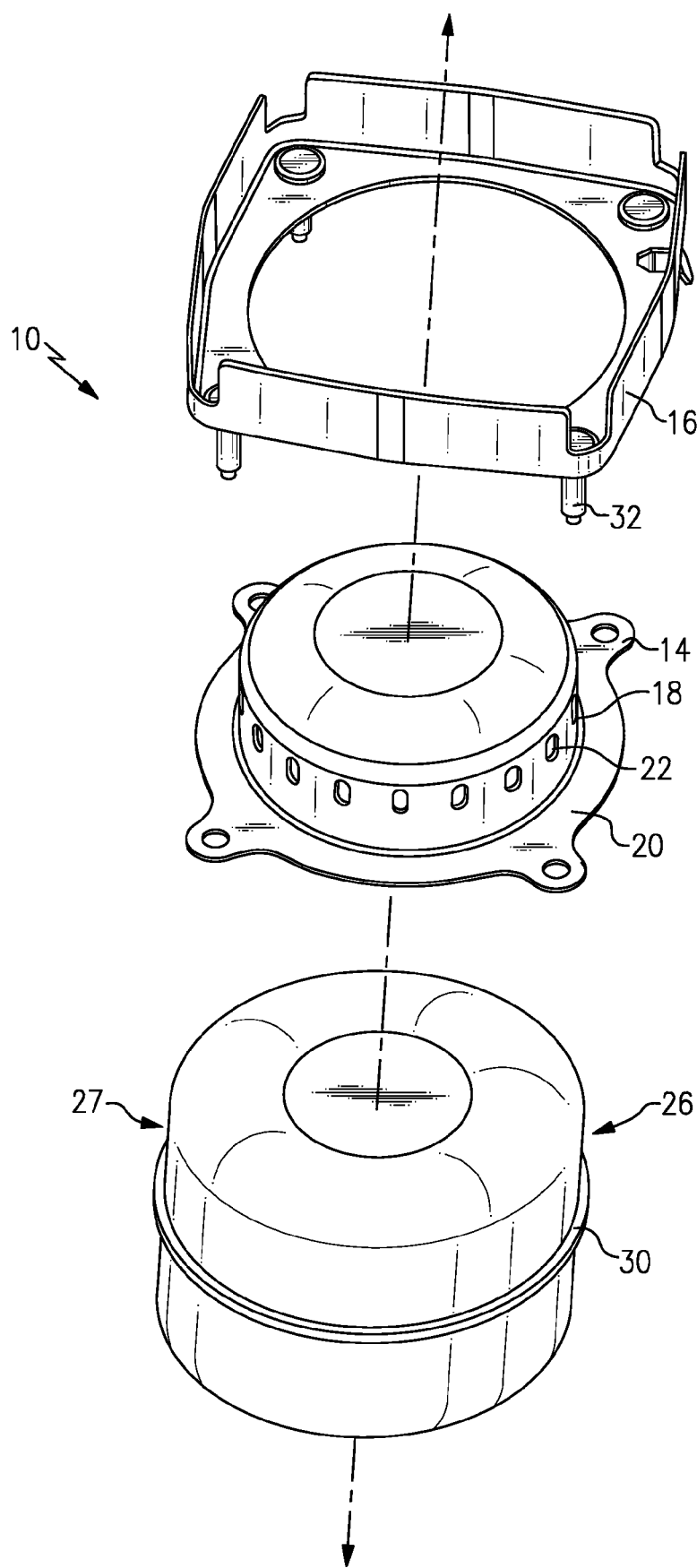
FIG. 1 shows an exploded view of a prior art airbag manifold assembly.

Referring to FIGS. 3-6, an example airbag inflator manifold assembly 50 includes a cap portion 54 and a baffle portion 58 that define an axis 60. The example airbag inflator manifold assembly 50 is formed from a single sheet of material and is a monolithic structure. A mounting face 62 extends radially from the cap portion 54 to directly connect the cap portion 54 to the baffle portion 58.

In this example, the mounting face 62 is secured directly to a flange 78 extending from a mounting ring 82, which is secured to an airbag inflator 74. The mounting face 62 is welded to the flange 78 for example. The flange 78 extends radially from the mounting ring 82, and the baffle portion 58 extends axially away from the perimeter of the mounting face 62.

In this example, the mounting ring 82 is press fit to a lower portion 83 of the airbag inflator 74 to hold the mounting ring 82 relative to the airbag inflator 74. In another example, the airbag inflator 74 includes the flange 78. In either of these examples, securing the cap portion 54 to the flange 78 secures the cap portion 54 relative to the airbag inflator 74. Further, in this example, the lower portion 83 is welded to an upper portion 85 resulting in a ridge 80. In some examples, the ridge 80 is removed, such as by a machining operation, to facilitate moving the cap portion 54 axially relative to the airbag inflator 74.

The example cap portion 54 includes a sidewall 66 that establish the apertures 70 for communicating flow from the airbag inflator 74. In this example, the sidewall 66 is not used for securing the airbag inflator manifold assembly 50 relative to the airbag inflator 74. Thus the example sidewall 66 can be spaced from the upper portion 85 of the airbag inflator manifold assembly 50 to provide a path for flow from the airbag inflator manifold assembly 50 to move through the apertures 70.

Figure 2:
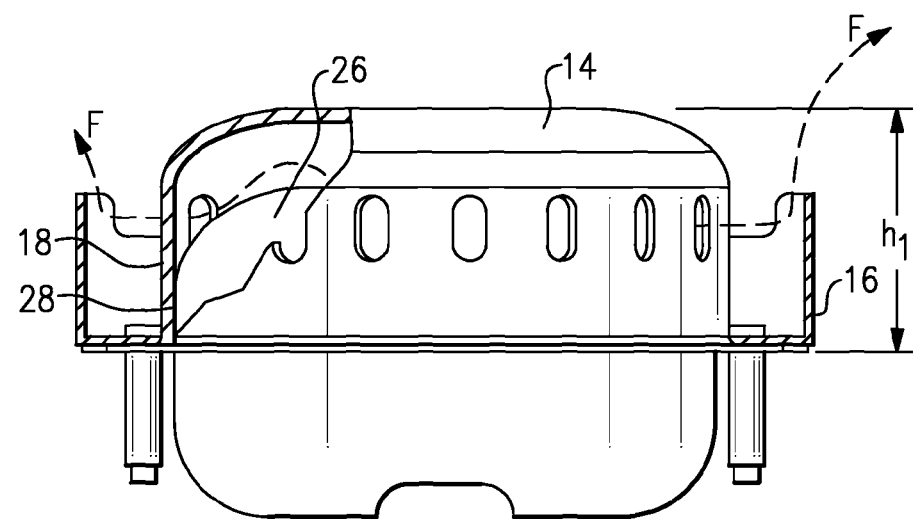
FIG. 2 shows a partial cut away view of the FIG. 1 prior art airbag manifold assembly in an assembled position.
Figure 4:
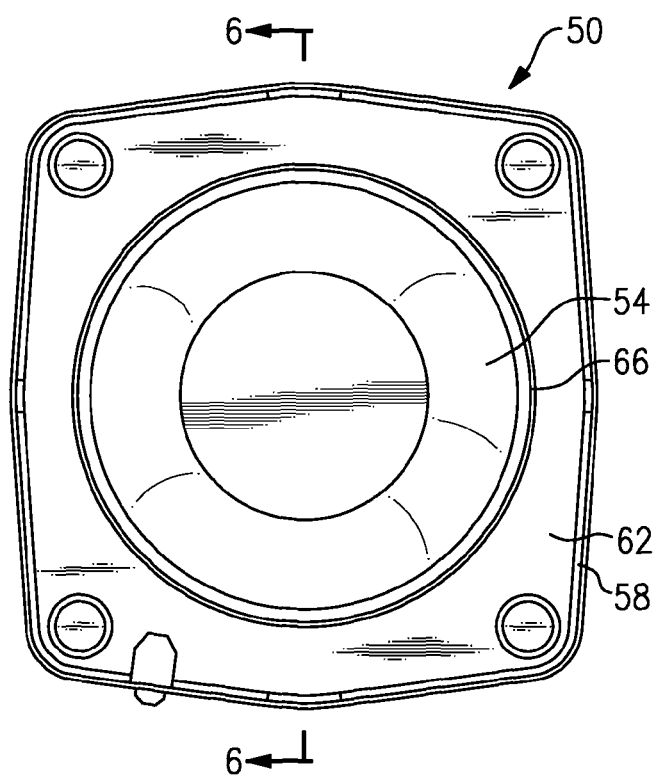
FIG. 4 shows a top view of the FIG. 3 assembly.
Figure 3:
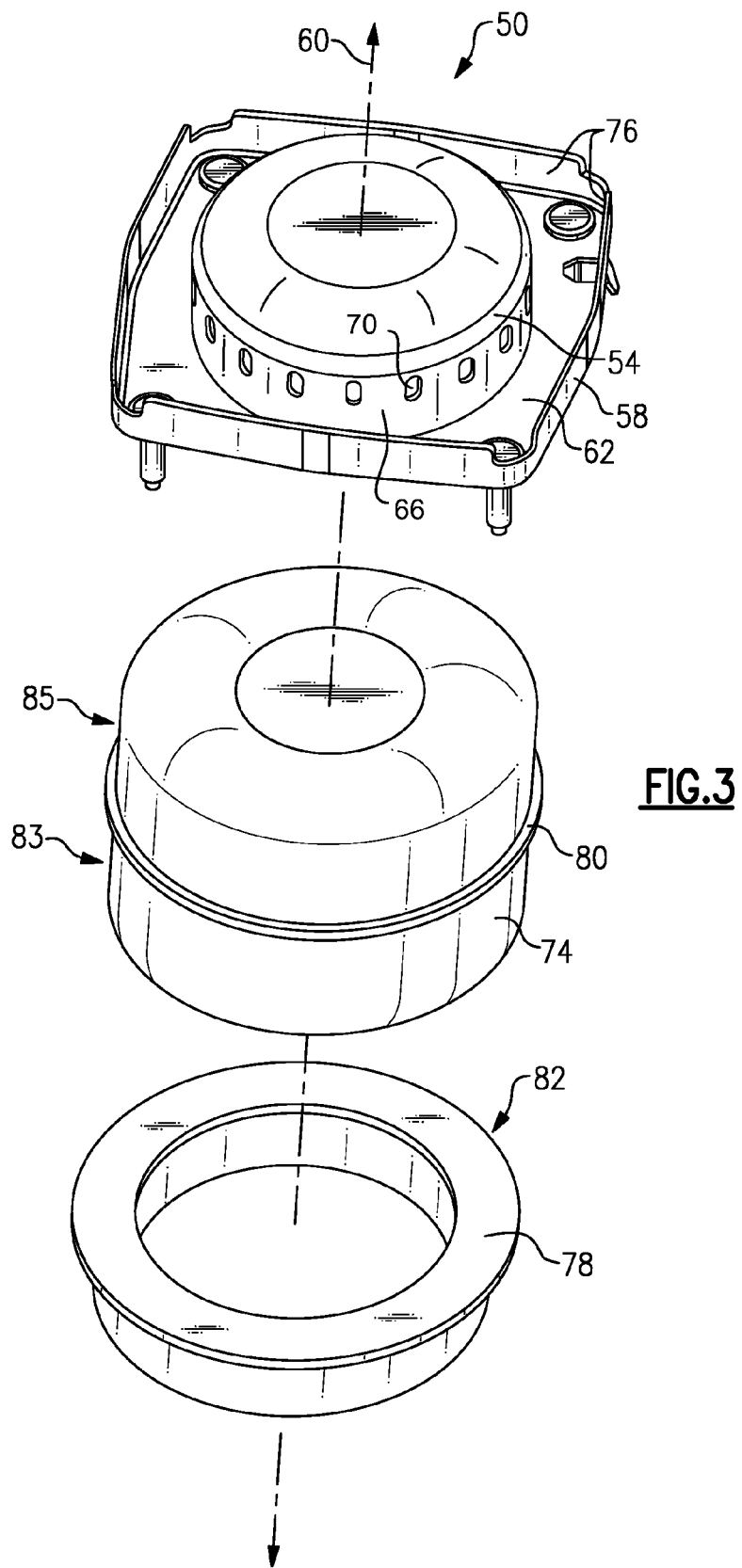
FIG. 3 shows an exploded view of an example airbag inflator manifold assembly.
Figure 5:
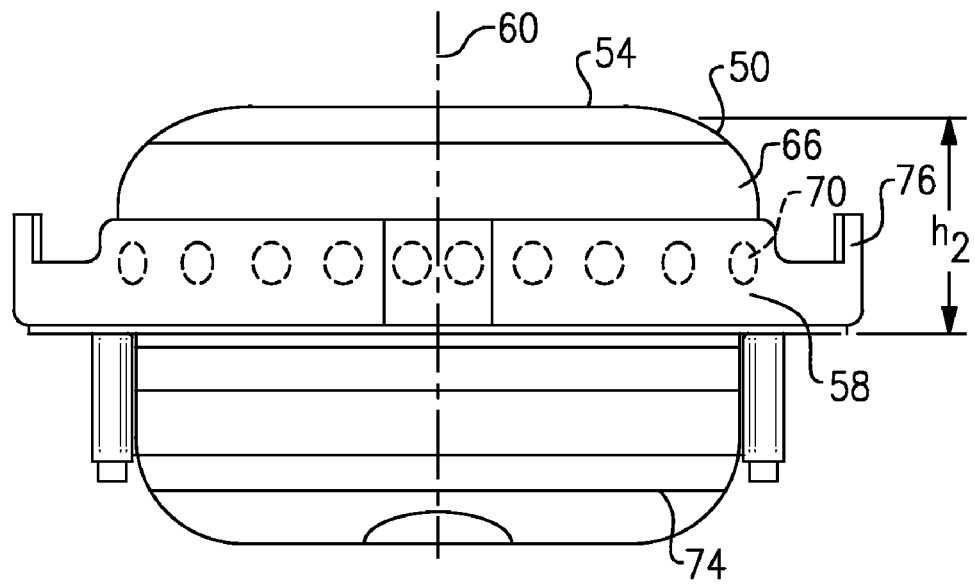
FIG. 5 shows a side view of the FIG. 3 assembly.
Figure 6:
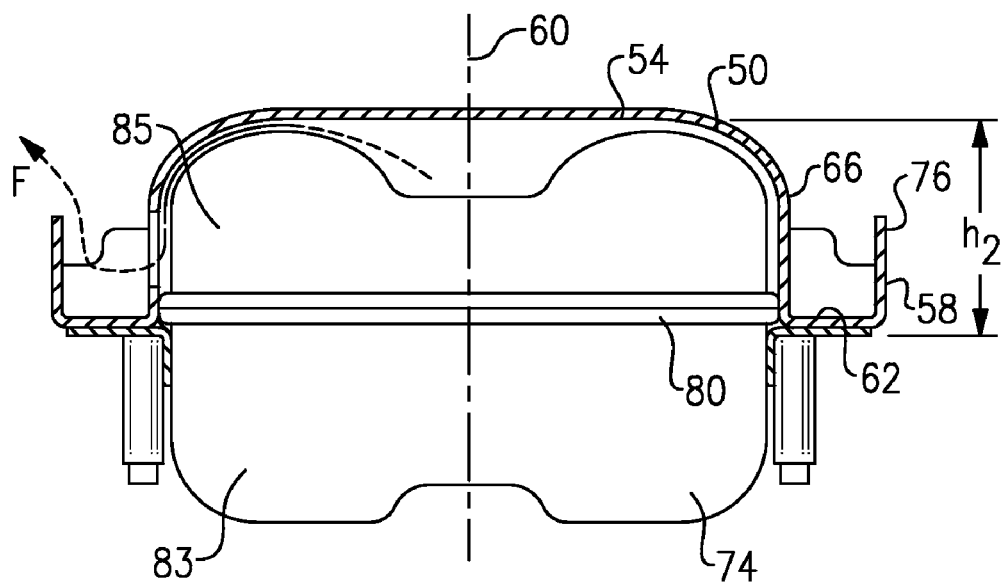
FIG. 6 shows a partial section view of the FIG. 3 assembly.

Notably, the height $h_2$ of the example sidewall 66 is less than the height $h_1$ of the prior art sidewall 18 in FIGS. 1 and 2 because the sidewall 66 is not used for both securing the airbag inflator manifold assembly 50 and for establishing the apertures 70. In the prior art, the height $h_1$ was required to establish the apertures 22 axially beyond the portion of the sidewall 18 secured to the airbag inflator 26 because the same portion of the sidewall 18 could not be used for both securing the airbag inflator manifold assembly 10 and for establishing the apertures 22.

In this example, Flow F from the airbag inflator 74 moves from the upper portion 85 of the airbag inflator 74 beneath the cap portion 54. The Flow F then moves radially away from the cap portion 54 through the apertures 70. The baffle portion 58 directs at least some of the flow from the apertures 70 in an axial direction. The example baffle portion 58 includes a plurality of individual baffles 76 that are generally planar and circumferentially arranged around the axis 60.

Notably, because the cap portion 54 is directly connected to the baffle portion 58, the position of the apertures 70 is consistent with the position of the baffle portion 58. Thus, the apertures 70 and the baffle portion 58 can be tuned to provide a desired flow to the interior of the airbag from a particular area of the airbag inflator manifold assembly 50. A person skilled in this art and having the benefit of this disclosure would be able to tune the apertures 70, the baffle portion 58, or both to achieve such flow. Example tuning includes angling an area of the baffle portion 58 closer to the cap portion 54, or increasing the size of one or more of the apertures 70.

Figure 7:
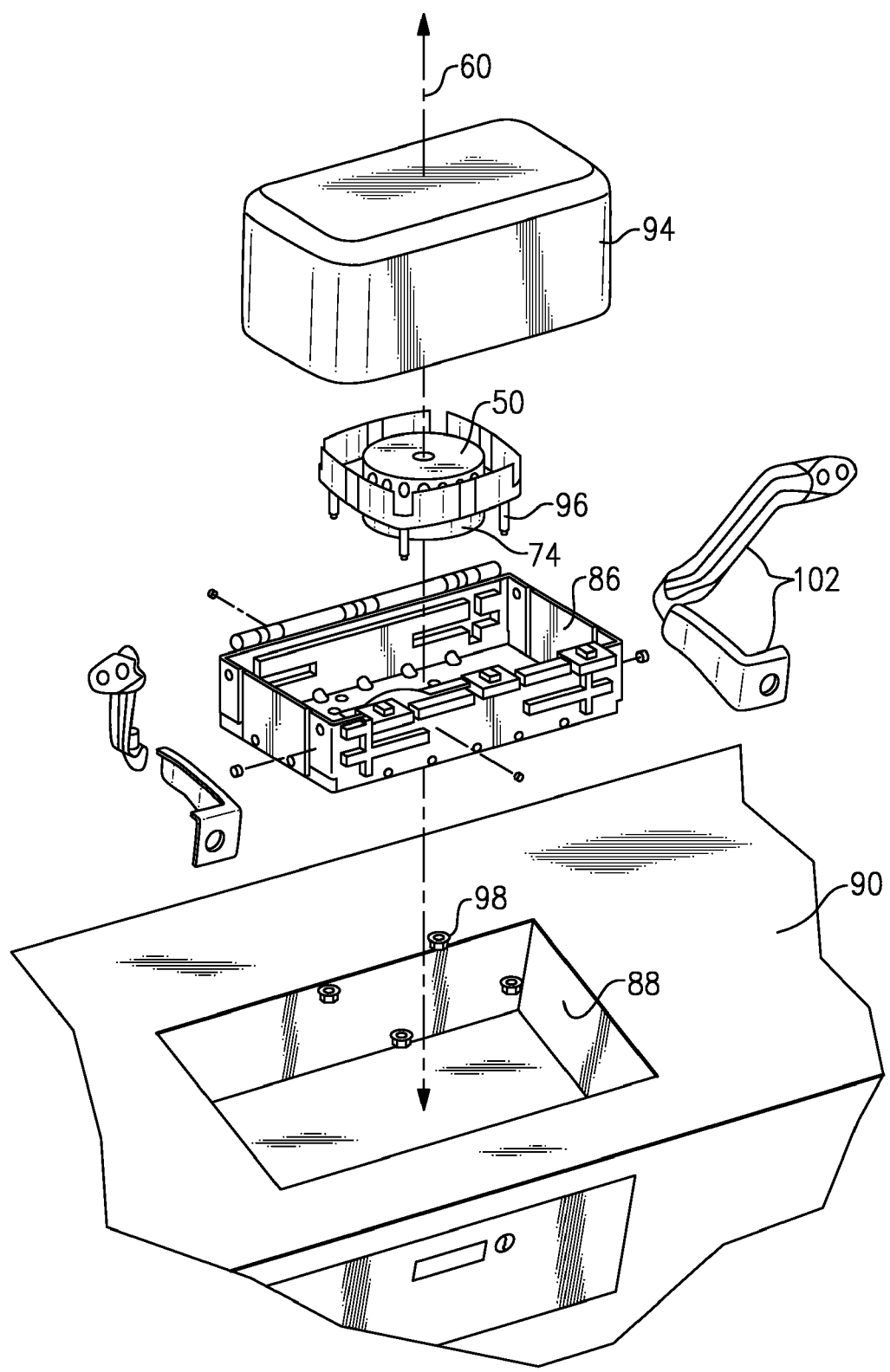
FIG. 7 shows an exploded view of the FIG. 3 assembly within a vehicle environment.

Referring now to FIG. 7, the example airbag inflator manifold assembly 50 and the airbag inflator 74 are installed within a housing 86 in a vehicle 90. In this example, the airbag inflator manifold assembly 50 is adapted to direct flow from the inflator 74 to a passenger-side airbag 94. Bolts 96 extend through the airbag inflator manifold assembly 50 and the housing 86 to hold the airbag inflator 74 relative to the housing 86. The bolts 96 secure to nuts 98 on an opposing side of the housing 86. The passenger side airbag 94 is secured within the housing 86, which is secured in a recessed area 88 of the vehicle 90 with a plurality of brackets 102. The example passenger-side airbag 94 is folded when secured. In one example, the airbag inflator 74 is at least partially secured within the airbag 94. That is, portions of the airbag 94 wrap around the airbag inflator 74 and are secured to the bolts 96. The airbag inflator 74 generates flow to inflate the passenger-side airbag in a known manner.

Features of the disclosed embodiment include facilitating greater design flexibility for aperture locations in an airbag inflator manifold as the cap portion of the airbag inflator is spaced from the airbag inflator. Another feature of the disclosed embodiment includes tunable baffles and aperture combinations because the apertures are associated with the particular baffle area.

Although a preferred embodiment has been disclosed, a worker of ordinary skill in this art would recognize that certain modifications would come within the scope of this invention. For that reason, the following claims should be studied to determine the true scope and content of this invention.

We claim:

1. An airbag inflator manifold assembly, comprising:
    a cap portion establishing a plurality of apertures, the cap portion operative to redirect axial flow from an inflator through the plurality of apertures in a radial direction;
    a baffle portion that redirects at least some of the flow from the plurality of apertures; and
    a mounting face that extends radially from the cap portion and is securable to a flange extending radially from the inflator to hold the cap portion and the baffle portion relative to the inflator.

2. The assembly of claim 1, wherein the baffle portion extends from the mounting face.

3. The assembly of claim 1, wherein the cap portion, the baffle portion, and the radially extending portion are a monolithic structure.

4. The assembly of claim 1, wherein the baffle portion comprises a plurality of baffles axially extending from the mounting face, the plurality of baffles arranged circumferentially around the cap portion.

5. The assembly of claim 4, wherein each of the plurality of baffles establishes a plane aligned with an axis of the inflator.

6. The assembly of claim 1, wherein the cap portion is spaced from the inflator.

7. The airbag inflator manifold assembly of claim 1, wherein the cap portion is separate from the inflator.

8. The airbag inflator manifold assembly of claim 1, wherein the inflator includes an upper portion secured directly to a lower portion, and the inflator is configured to communicate the axial flow through the upper portion.

9. The airbag inflator manifold assembly of claim 8, wherein the upper portion is welded to the lower portion.

10. The airbag inflator manifold assembly of claim 8, wherein the cap portion is radially spaced from the upper portion.

11. The airbag inflator manifold assembly of claim 8, wherein a sidewall of the upper portion is unapertured.

12. An airbag inflator manifold assembly, comprising:
    a mounting flange having a radially extending portion and an axially extending portion that is securable directly to a lower portion of an airbag inflator; and
    a manifold having a mounting face that is configured to be mounted directly to the radially extending portion, the manifold establishing a plurality of radially directed apertures and being configured to redirect axial flow that is communicated through an upper portion of the airbag inflator through the radially directed apertures.

13. The assembly of claim 12, including a baffle extending axially from the manifold to redirect flow from the plurality of apertures.

14. The assembly of claim 12, wherein the manifold is secured to said mounting flange at a location spaced from the airbag inflator.

15. The airbag inflator manifold assembly of claim 12, wherein the upper portion is welded to the lower portion.

16. The airbag inflator manifold assembly of claim 12, wherein the upper portion comprises a circumferential wall that is entirely unapertured.

17. A method of controlling flow from an airbag inflator, comprising,
    (a) receiving an upper portion of an airbag inflator within a cap portion of an airbag inflator manifold;
    (b) receiving a lower portion of the airbag inflator within a mounting ring;
    (c) securing the airbag inflator manifold to a radially extending flange of the mounting ring to secure the cap portion relative to the upper portion of the airbag inflator, wherein the cap portion is spaced from the upper portion of the airbag inflator when the airbag inflator manifold is secured to the flange;
    (d) redirecting at least some axial flow from the airbag inflator in a radial direction through a plurality of apertures established by a cap portion of an airbag inflator manifold; and
    (e) guiding at least some flow from the plurality of apertures in an axial direction using a baffle portion of the airbag inflator manifold, wherein the cap portion and the baffle portion are formed from a single sheet of material.

18. The method of claim 17, comprising the step of welding the airbag inflator manifold to the radially extending flange.

19. The method of claim 18, comprising the step of machining the airbag inflator to remove a ridge created when the lower portion of the airbag inflator is welded to the upper portion of the airbag inflator.

* * * * *